United States Patent
Camp et al.

(10) Patent No.: US 11,176,036 B2
(45) Date of Patent: *Nov. 16, 2021

(54) ENDURANCE ENHANCEMENT SCHEME USING MEMORY RE-EVALUATION

(71) Applicant: International Business Machines Corporation, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Ioannis Koltsidas, Zurich (CH); Roman A. Pletka, Uster (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/358,176

(22) Filed: Mar. 19, 2019

(65) Prior Publication Data
US 2019/0213124 A1 Jul. 11, 2019

Related U.S. Application Data

(63) Continuation of application No. 14/581,976, filed on Dec. 23, 2014, now Pat. No. 10,339,048.

(51) Int. Cl.
*G06F 12/00* (2006.01)
*G06F 12/02* (2006.01)

(52) U.S. Cl.
CPC ...... *G06F 12/0261* (2013.01); *G06F 12/0246* (2013.01); *G06F 2212/1036* (2013.01);
(Continued)

(58) Field of Classification Search
None
See application file for complete search history.

(56) References Cited

U.S. PATENT DOCUMENTS

| 5,490,110 A | 2/1996 | Sawada et al. |
| 5,559,956 A | 9/1996 | Sukegawa |

(Continued)

FOREIGN PATENT DOCUMENTS

| CN | 101325089 A | 12/2008 |
| EP | 1008936 A2 | 6/2000 |

(Continued)

OTHER PUBLICATIONS

Supplemental Notice of Allowance from U.S. Appl. No. 14/520,034, dated Jul. 3, 2019.

(Continued)

*Primary Examiner* — Prasith Thammavong
(74) *Attorney, Agent, or Firm* — Zilka-Kotab, P.C.

(57) ABSTRACT

An apparatus, according to one embodiment, includes non-volatile memory configured to store data, and a controller and logic integrated with and/or executable by the controller, the logic being configured to: determine, by the controller, that at least one block of the non-volatile memory and/or portion of a block of the non-volatile memory meets a retirement condition, re-evaluate, by the controller, the at least one block and/or the portion of a block to determine whether to retire the at least one block and/or the portion of a block, indicate, by the controller, that the at least one block and/or the portion of a block remains usable when a result of the re-evaluation is not to retire the block, and indicate, by the controller, that the at least one block and/or the portion of a block is retired when the result of the re-evaluation is to retire the block.

18 Claims, 7 Drawing Sheets

(52) U.S. Cl.
CPC ............... *G06F 2212/7205* (2013.01); *G06F 2212/7208* (2013.01)

(56) References Cited

U.S. PATENT DOCUMENTS

| | | |
|---|---|---|
| 5,673,383 A | 9/1997 | Sukegawa |
| 5,832,493 A | 11/1998 | Marshall et al. |
| 5,905,993 A | 5/1999 | Shinohara |
| 6,259,627 B1 | 7/2001 | Wong |
| 6,553,104 B1 | 4/2003 | Haefliger |
| 6,996,692 B2 | 2/2006 | Kouno |
| 7,424,666 B2 | 9/2008 | Chandwani et al. |
| 7,542,344 B2 | 6/2009 | Kim |
| 7,545,677 B2 | 6/2009 | Lee et al. |
| 7,649,782 B2 | 1/2010 | Eguchi et al. |
| 7,808,836 B2 | 10/2010 | Murin et al. |
| 7,986,560 B2 | 7/2011 | Park et al. |
| 8,116,141 B2 | 2/2012 | Yoo et al. |
| 8,281,220 B2 | 10/2012 | Kitahara |
| 8,296,620 B2 | 10/2012 | Chen et al. |
| 8,356,216 B2 | 1/2013 | Radke et al. |
| 8,447,919 B1 | 5/2013 | Agarwal et al. |
| 8,463,983 B2 | 6/2013 | Eleftheriou et al. |
| 8,527,819 B2 | 9/2013 | Shalvi et al. |
| 8,555,109 B2 | 10/2013 | Dhuse et al. |
| 8,601,313 B1 | 12/2013 | Horn |
| 8,687,421 B2 | 4/2014 | Avila et al. |
| 8,938,659 B2 | 1/2015 | Wu et al. |
| 9,075,705 B2 | 7/2015 | Hikichi |
| 9,558,107 B2 | 1/2017 | Camp et al. |
| 9,639,462 B2 | 5/2017 | Camp et al. |
| 9,990,279 B2 | 6/2018 | Camp et al. |
| 10,339,048 B2 | 7/2019 | Camp et al. |
| 10,365,859 B2 | 7/2019 | Camp et al. |
| 10,410,732 B1 * | 9/2019 | Eliash .................... G11C 29/70 |
| 2004/0083335 A1 | 4/2004 | Gonzalez et al. |
| 2005/0093571 A1 | 5/2005 | Suaris et al. |
| 2005/0190615 A1 | 9/2005 | Linde et al. |
| 2005/0264910 A1 | 12/2005 | Lee |
| 2006/0200299 A1 | 9/2006 | Torno et al. |
| 2007/0180328 A1 | 8/2007 | Cornwell et al. |
| 2008/0123419 A1 | 5/2008 | Brandman et al. |
| 2008/0192544 A1 | 8/2008 | Berman et al. |
| 2009/0003073 A1 | 1/2009 | Rizel et al. |
| 2009/0003703 A1 | 1/2009 | Zhang et al. |
| 2009/0070654 A1 | 3/2009 | Flachs et al. |
| 2009/0125671 A1 | 5/2009 | Flynn et al. |
| 2009/0141563 A1 | 6/2009 | Furnemont |
| 2009/0323412 A1 | 12/2009 | Mokhlesi et al. |
| 2009/0323423 A1 | 12/2009 | Bloom et al. |
| 2010/0046302 A1 | 2/2010 | Ogura et al. |
| 2010/0064096 A1 | 3/2010 | Weingarten et al. |
| 2010/0251075 A1 | 9/2010 | Takahashi et al. |
| 2010/0257429 A1 | 10/2010 | Noguchi |
| 2011/0041039 A1 | 2/2011 | Harari et al. |
| 2011/0131367 A1 | 6/2011 | Park et al. |
| 2011/0238890 A1 | 9/2011 | Sukegawa |
| 2012/0023365 A1 | 1/2012 | Byom et al. |
| 2012/0047409 A1 | 2/2012 | Post et al. |
| 2012/0066441 A1 | 3/2012 | Weingarten |
| 2012/0198128 A1 | 8/2012 | Van Aken |
| 2012/0216085 A1 | 8/2012 | Weingarten et al. |
| 2012/0226963 A1 | 9/2012 | Bivens et al. |
| 2012/0239858 A1 | 9/2012 | Melik-Martirosian |
| 2012/0239991 A1 | 9/2012 | Melik-Martirosian |
| 2012/0246540 A1 | 9/2012 | Lee et al. |
| 2012/0250415 A1 | 10/2012 | Sharon et al. |
| 2012/0278651 A1 | 11/2012 | Muralimanohar et al. |
| 2012/0284587 A1 | 11/2012 | Yu et al. |
| 2012/0304039 A1 | 11/2012 | Peterson et al. |
| 2012/0311271 A1 | 12/2012 | Klein et al. |
| 2012/0311381 A1 | 12/2012 | Porterfield |
| 2012/0311388 A1 | 12/2012 | Cronin et al. |
| 2012/0324299 A1 | 12/2012 | Moshayedi |
| 2012/0331207 A1 | 12/2012 | Lassa et al. |
| 2013/0073786 A1 | 3/2013 | Belgal et al. |
| 2013/0094286 A1 | 4/2013 | Sridharan et al. |
| 2013/0111298 A1 | 5/2013 | Seroff et al. |
| 2013/0124787 A1 | 5/2013 | Schuette |
| 2013/0124931 A1 | 5/2013 | Chen |
| 2013/0145079 A1 | 6/2013 | Lee et al. |
| 2013/0166827 A1 | 6/2013 | Cideciyan et al. |
| 2013/0194865 A1 | 8/2013 | Bandic et al. |
| 2013/0215682 A1 | 8/2013 | Yang |
| 2013/0227200 A1 | 8/2013 | Cometti et al. |
| 2013/0294184 A1 | 11/2013 | Yang et al. |
| 2013/0297988 A1 | 11/2013 | Wu et al. |
| 2013/0339574 A1 | 12/2013 | Franceschini et al. |
| 2013/0343129 A1 | 12/2013 | Wakchaure et al. |
| 2014/0006694 A1 | 1/2014 | Seo et al. |
| 2014/0029336 A1 | 1/2014 | Venkitachalam et al. |
| 2014/0040664 A1 | 2/2014 | Hida et al. |
| 2014/0040681 A1 | 2/2014 | Wolfman et al. |
| 2014/0059405 A1 | 2/2014 | Syu et al. |
| 2014/0082440 A1 | 3/2014 | Ho et al. |
| 2014/0089564 A1 | 3/2014 | Liu et al. |
| 2014/0095110 A1 | 4/2014 | Chen et al. |
| 2014/0101490 A1 | 4/2014 | Cronin et al. |
| 2014/0115238 A1 | 4/2014 | Xi et al. |
| 2014/0126292 A1 | 5/2014 | Yang et al. |
| 2014/0136927 A1 | 5/2014 | Li et al. |
| 2014/0204672 A1 | 7/2014 | Lee et al. |
| 2014/0208004 A1 | 7/2014 | Cohen et al. |
| 2014/0208041 A1 | 7/2014 | Hyde et al. |
| 2014/0208174 A1 | 7/2014 | Ellis et al. |
| 2014/0226398 A1 | 8/2014 | Desireddi et al. |
| 2014/0334228 A1 | 11/2014 | Kim et al. |
| 2014/0359202 A1 * | 12/2014 | Sun ..................... G06F 12/0246 711/103 |
| 2015/0033087 A1 * | 1/2015 | Marquart ............ G06F 11/1048 714/718 |
| 2015/0103593 A1 | 4/2015 | Su |
| 2015/0154061 A1 | 6/2015 | Camp et al. |
| 2015/0161034 A1 | 6/2015 | Fisher |
| 2015/0161035 A1 | 6/2015 | Fisher et al. |
| 2015/0161036 A1 | 6/2015 | Camp et al. |
| 2015/0169403 A1 | 6/2015 | Yen et al. |
| 2015/0169468 A1 | 6/2015 | Camp et al. |
| 2015/0170746 A1 | 6/2015 | Oowada et al. |
| 2015/0177995 A1 | 6/2015 | Camp et al. |
| 2015/0220385 A1 * | 8/2015 | Wood .................... G06F 3/0613 714/6.24 |
| 2015/0243363 A1 | 8/2015 | Wu et al. |
| 2015/0262712 A1 | 9/2015 | Chen et al. |
| 2016/0110124 A1 | 4/2016 | Camp et al. |
| 2016/0110248 A1 | 4/2016 | Camp et al. |
| 2016/0179412 A1 | 6/2016 | Camp et al. |
| 2016/0179664 A1 | 6/2016 | Camp et al. |
| 2019/0065331 A1 * | 2/2019 | Singidi ............... G06F 11/1068 |
| 2019/0227950 A1 * | 7/2019 | Shaeffer ............... G06F 12/023 |

FOREIGN PATENT DOCUMENTS

| | | |
|---|---|---|
| JP | H05282880 A | 10/1993 |
| JP | 5203049 B2 | 6/2013 |
| KR | 20130088061 A | 8/2013 |
| WO | 2009072100 A2 | 6/2009 |
| WO | 2009114618 A2 | 9/2009 |

OTHER PUBLICATIONS

Notice of Allowance from U.S. Appl. No. 14/568,178, dated Dec. 23, 2016.

Final Office Action from U.S. Appl. No. 14/581,963, dated Feb. 10, 2017.

Advisory Action from U.S. Appl. No. 14/581,963, dated Apr. 21, 2017.

Final Office Action from U.S. Appl. No. 14/520,034, dated Apr. 24, 2017.

Non-Final Office Action from U.S. Appl. No. 14/581,963, dated May 23, 2017.

(56) References Cited

OTHER PUBLICATIONS

Non-Final Office Action from U.S. Appl. No. 14/581,976, dated Jul. 28, 2017.
Final Office Action from U.S. Appl. No. 14/581,963, dated Nov. 24, 2017.
Examiner's Answer to Appeal Brief from U.S. Appl. No. 14/520,034, dated Jan. 3, 2018.
Notice of Allowance from U.S. Appl. No. 14/581,963, dated Jan. 29, 2018.
Final Office Action from U.S. Appl. No. 14/581,976, dated Oct. 18, 2018.
Patent Board Decision on Appeal from U.S. Appl. No. 14/520,034, dated Dec. 28, 2018.
Notice of Allowance from U.S. Appl. No. 14/581,976, dated Feb. 21, 2019.
Notice of Allowance from U.S. Appl. No. 14/520,034, dated Mar. 11, 2019.
List of IBM Patents Or Patent Applications Treated as Related.
Camp et al., U.S. Appl. No. 14/500,900, filed Oct. 21, 2014.
Notice of Allowance from U.S. Appl. No. 14/500,900, dated Sep. 22, 2015.
Camp et al., U.S. Appl. No. 14/581,963, filed Dec. 23, 2014.
Camp et al., U.S. Appl. No. 14/520,276, filed Oct. 21, 2014.
Camp et al., U.S. Appl. No. 14/581,976, filed Dec. 23, 2014.
Camp et al., U.S. Appl. No. 14/139,925, filed Dec. 24, 2013.
Non-Final Office Action from U.S. Appl. No. 14/139,925, dated Jul. 8, 2015.
International Search Report and Written Opinion from PCT Application No. PCT/JP2014/005371, dated Dec. 16, 2014.
Camp et al., U.S. Appl. No. 14/520,034, filed Oct. 21, 2014.
Camp et al., U.S. Appl. No. 14/568,178, filed Dec. 12, 2014.
Anonymous, "Method of combined data retention and wear leveling scan for minimizing flash resource contention in flash based memory systems," IP.com Electronic Publication, Aug. 10, 2013, pp. 1-3.
Cai et al., "Threshold Voltage Distribution in MLC NAND Flash Memory: Characterization, Analysis, and Modeling," European Design and Automation Association, Mar. 2013, pp. 1-6.
Chang et al., "Endurance Enhancement of Flash-Memory Storage Systems: An Efcient Static Wear Leveling Design," 44th ACM/IEEE Design Automation Conference, Jun. 4-8, 2007, pp. 212-217.
Chang et al., "A Low-Cost Wear-Leveling Algorithm for Block-Mapping Solid-State Disks," ACM SIGPLAN/SIGBED Conference on Languages, Compilers, Tools and Theory for Embedded Systems, Apr. 11-14, 2011, pp. 31-40.
Chang, Li-Pin, "On Efficient Wear Leveling for Large-Scale Flash-Memory Storage Systems," Proceedings of the 2007 ACM symposium on Applied computing, Mar. 11-15, 2007, 5 pages.
Chen et al., "Bias-induced oxygen adsorption in zinc tin oxide thin film transistors under dynamic stress," Applied Physics Letters 96, No. 26, Jun. 2010, p. 262104-1-262104-3.
Cho et al., "NAND Reliability Improvement with Controller Assisted Algorithms in SSD," Flash Memory Summit, Santa Clara, CA, Aug. 2013, pp. 1-18.
Choi et al., "Wear Leveling for PCM Using Hot Data Identification." Proceedings of the International Conference on IT Convergence and Security 2011, Dec. 7, 2011, 2 pages.
Dong et al., "Using Lifetime-Aware Progressive Programming to Improve SLC NAND Flash Memory Write Endurance," IEEE, Jul. 3, 2013, pp. 1270-1280.
Frickey, R., "Data Integrity on 20nm SSDs," Flash Memory Summit, Aug. 2012, pp. 1-24.
Gregori et al., "On-Chip Error Correcting Techniques for New-Generation Flash Memories," Proceedings of the IEEE, vol. 91, Issue 4, Apr. 2003, pp. 602-616.
Grupp et al., "Characterizing Flash Memory: Anomalies, Observations, and Applications," IEEE/ACM International Symposium on Microarchitecture, Dec. 12-16, 2009, 10 pages.
Hsieh et al., "Efficient Identification of Hot Data for Flash Memory Storage Systems," ACM Transactions on Storage, vol. 2, No. 1, Feb. 2006, pp. 22-40.
Hu et al., "Container Marking: Combining Data Placement, Garbage Collection and Wear Levelling for Flash," IEEE, Jul. 25-27, 2011, pp. 237-247.
Huang et al., "An Aggressive Worn-out Flash Block Management Scheme to Alleviate SSD Performance Degradation," Eurosys '14, Apr. 14-16, 2014, 14 pages.
Hutsell et al., "Flash Solid-State Disk Reliability," Texas Memory Systems, Nov. 2008, pp. 1-16.
Hutsell, W., "An In-depth Look at the RamSan-500 Cached Flash Solid State Disk," Texas Memory Systems, Mar. 2008, pp. 1-14.
Hutsell, W., "An In-depth Look at the RamSan-620 Flash Solid State Disk," Texas Memory Systems, Jul. 2009, pp. 1-16.
Jung et al., "A Group-Based Wear-Leveling Algorithm for Large-Capacity Flash Memory Storage Systems," Proceedings of the 2007 International Conference on Compilers, architecture, and synthesis for embedded systems, Sep. 30-Oct. 3, 2007, pp. 160-164.
Micheloni et al., "Non-volatile memories for removable media," Proceedings of the IEEE, vol. 97, No. 1, Jan. 2009, pp. 148-160.
Prince, B., "After DRAM—Some Novel Contenders," Emerging Memories: Technologies and Trends, Feb. 28, 2002, pp. 181-233.
Qureshi et al., "Enhancing Lifetime and Security of PCM-Based Main Memory with Start-Gap Wear Leveling," 42nd Annual IEEE/ACM International Symposium on Microarchitecture, Dec. 12-16, 2009, pp. 14-23.
Schmidt et al., "Heavy Ion SEE Studies on 4-Gbit NAND-Flash Memories," IEEE, Sep. 10-14, 2007, pp. 1-4.
Silverton Consulting, Inc., "IBM FlashSystem 840 RAS for better performance and data protection," StorInt Briefling, Jun. 2012, pp. 1-7.
Non-Final Office Action from U.S. Appl. No. 14/520,276, dated Mar. 29, 2016.
Non-Final Office Action from U.S. Appl. No. 14/139,925, dated Jan. 4, 2016.
Non-Final Office Action from U.S. Appl. No. 14/581,976, dated Apr. 11, 2016.
Non-Final Office Action from U.S. Appl. No. 14/520,034, dated May 6, 2016.
Final Office Action from U.S. Appl. No. 14/139,925, dated May 20, 2016.
Wong et al., "Phase Change Memory," Proceedings of the IEEE, vol. 98, No. 12, Nov. 2012, pp. 2201-2227.
Ricco et al., "Nonvolatile Multilevel Memories for Digital Applications," Proceedings of the IEEE, vol. 86, No. 12, Dec. 1998, pp. 2399-2423.
Chien et al., "A Multi-Level 40nm WOx Resistive Memory with Excellent Reliability," Electron Devices Meeting (IEDM) 2011 IEEE International, Dec. 5-7, 2011, p. 31 5.1-31.5.4.
Non-Final Office Action from U.S. Appl. No. 14/581,963, dated Sep. 13, 2016.
Notice of Allowance from U.S. Appl. No. 14/568,178, dated Sep. 12, 2016.
Jimenez et al., "Wear Unleveling: Improving NAND Flash Lifetime by Balancing Page Endurance," 12th USENIX Conference on File and Storage Technologies, Feb. 17-20, 2014, pp. 47-59.
Notice of Allowance from U.S. Appl. No. 14/520,276, dated Sep. 15, 2016.
Notice of Allowance from U.S. Appl. No. 14/139,925, dated Sep. 16, 2016.
Supplemental Notice of Allowance from U.S. Appl. No. 14/520,276, dated Oct. 20, 2016.
Non-Final Office Action from U.S. Appl. No. 14/520,034, dated Oct. 27, 2016.
Non-Final Office Action from U.S. Appl. No. 14/581,976, dated Dec. 21, 2016.

* cited by examiner

ENDURANCE ENHANCEMENT SCHEME USING MEMORY RE-EVALUATION

BACKGROUND

The present invention relates to non-volatile memory, such as NAND Flash memory, and more specifically, this invention relates to re-evaluating units of non-volatile memory indicated for retirement.

Using Flash memory as an example, the performance characteristics of conventional NAND Flash-based solid state drives (SSDs) are fundamentally different from those of traditional hard disk drives (HDDs). Data in conventional SSDs is typically organized in physical pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block is typically 128, 256 or 512 pages and the erase operations takes approximately one order of magnitude more time than a page program operation. Due to the intrinsic properties of NAND Flash, Flash-based SSDs write data out-of-place whereby a mapping table maps logical addresses of the written data to physical ones at a granularity of a logical page size of typically 4 KB. This mapping table is commonly referred to as the Logical-to-Physical Table (LPT). To improve storage efficiency, one or more logical pages can be mapped to a single physical memory page and/or logical pages might be split over more than one physical memory page. It follows that the LPT may additionally be responsible for keeping track of the necessary start, length and offset values for all logical page mappings.

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction codes (ECC) which, for example, may include BCH codes. While the addition of ECC in pages is relatively straightforward, the organization of memory blocks into RAID-like stripes is more complex. For instance, individual blocks which exhibit errors are irreversibly retired over time. As the organization of stripes together with the LPT defines the placement of data, SSDs typically utilize a Log-Structured Array (LSA) architecture, which combines these two methods. However, the retirement of memory blocks requires either reorganization of the stripes, or capacity reduction of the stripe which is typically performed by conventional products. Moreover, when memory blocks are retired, write amplification increases, lifetime of the corresponding device decrease, etc.

The LSA architecture relies on out-of-place writes. In this approach, a memory page overwrite will result in writing the logical page data to a new location in memory, marking the old copy of the logical page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that have to be relocated, as relocating data causes additional write operations, and thereby increases write amplification.

BRIEF SUMMARY

An apparatus, according to one embodiment, includes non-volatile memory configured to store data, and a controller and logic integrated with and/or executable by the controller. The logic integrated with and/or executable by the controller is configured to: determine, by the controller, that at least one block of the non-volatile memory and/or portion of a block of the non-volatile memory meets a retirement condition, re-evaluate, by the controller, the at least one block and/or the portion of a block to determine whether to retire the at least one block and/or the portion of a block, indicate, by the controller, that the at least one block and/or the portion of a block remains usable when a result of the re-evaluation is not to retire the block, and indicate, by the controller, that the at least one block and/or the portion of a block is retired when the result of the re-evaluation is to retire the block.

A computer-implemented method is provided, according to another embodiment, where such computer may be implemented in or as a controller. The method includes determining that at least one block of the non-volatile memory and/or portion of a block of the non-volatile memory meets a retirement condition, re-evaluating the at least one block and/or the portion of a block to determine whether to retire the at least one block and/or the portion of a block, indicating that the at least one block and/or the portion of a block remains usable when a result of the re-evaluation is not to retire the block, and indicating that the at least one block and/or the portion of a block is retired when the result of the re-evaluation is to retire the block.

A computer program product, according to yet another embodiment, includes a computer readable storage medium having program instructions embodied therewith, the program instructions readable and/or executable by a controller to cause the controller to: determine, by the controller, that at least one block of the non-volatile memory and/or portion of a block of the non-volatile memory meets a retirement condition, re-evaluate, by the controller, the at least one block and/or the portion of a block to determine whether to retire the at least one block and/or the portion of a block, indicate, by the controller, that the at least one block and/or the portion of a block remains usable when a result of the re-evaluation is not to retire the block, and indicate, by the controller, that the at least one block and/or the portion of a block is retired when the result of the re-evaluation is to retire the block.

Other aspects and embodiments of the present invention will become apparent from the following detailed description, which, when taken in conjunction with the drawings, illustrate by way of example the principles of the invention.

DETAILED DESCRIPTION

Figure 1:
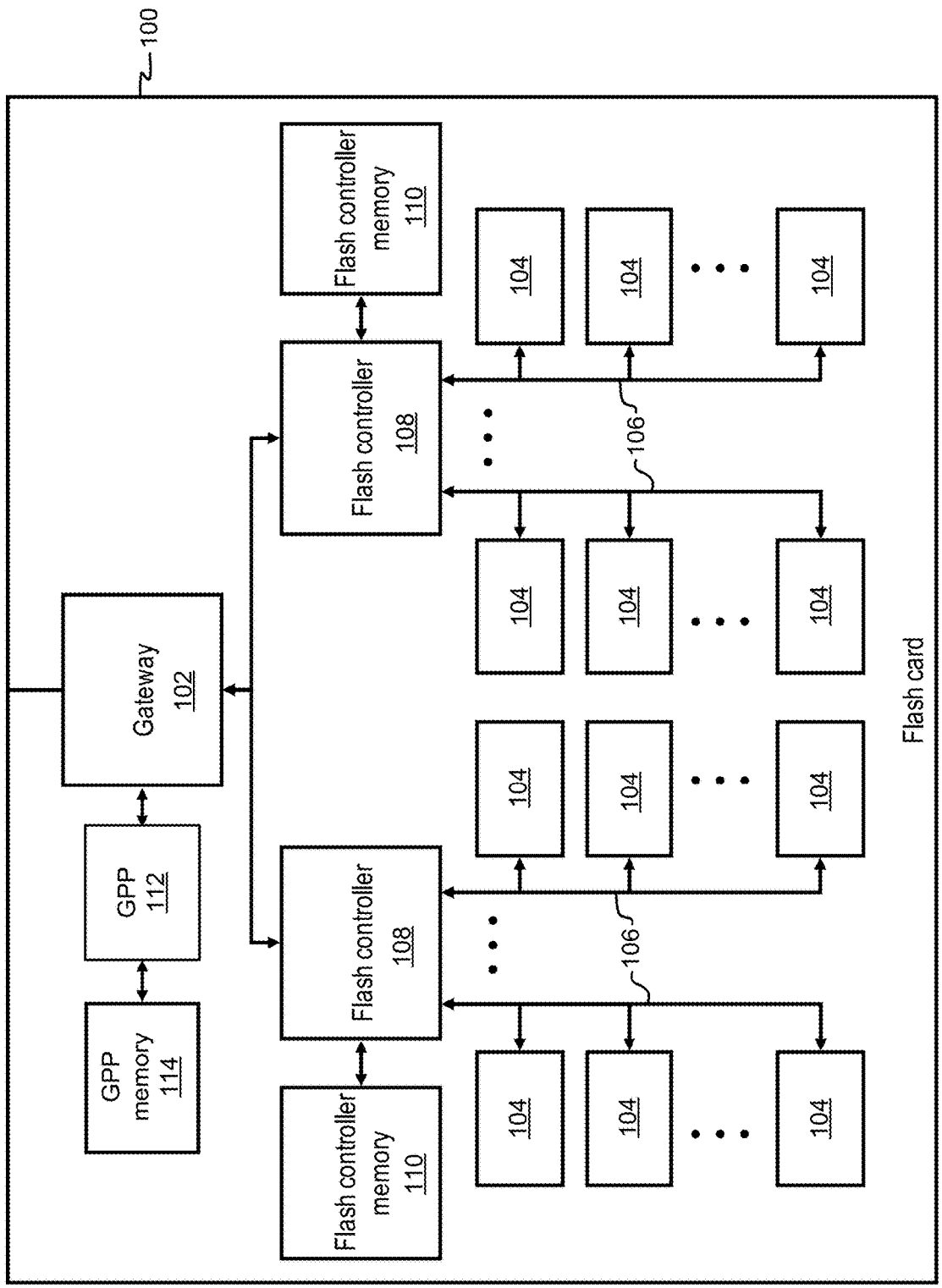
FIG. 1 shows a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, as used herein, the term "about" with reference to some stated value may refer to the stated value ±10% of said value.

The following description discloses several preferred embodiments of data storage systems, as well as operation and/or component parts thereof. Various embodiments described herein are able to re-evaluate units of memory which have been retired. According to different approaches, various operations may be performed in order to determine whether a given unit of non-volatile memory should be permanently retired or reactivated, as will be described in further detail below.

It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, an apparatus includes non-volatile memory configured to store data, and a controller and logic integrated with and/or executable by the controller. The logic integrated with and/or executable by the controller is configured to: determine, by the controller, that at least one block of the non-volatile memory and/or portion of a block of the non-volatile memory meets a retirement condition, re-evaluate, by the controller, the at least one block and/or the portion of a block to determine whether to retire the at least one block and/or the portion of a block, indicate, by the controller, that the at least one block and/or the portion of a block remains usable when a result of the re-evaluation is not to retire the block, and indicate, by the controller, that the at least one block and/or the portion of a block is retired when the result of the re-evaluation is to retire the block.

In another general embodiment, a method includes determining that at least one block of the non-volatile memory and/or portion of a block of the non-volatile memory meets a retirement condition, re-evaluating the at least one block and/or the portion of a block to determine whether to retire the at least one block and/or the portion of a block, indicating that the at least one block and/or the portion of a block remains usable when a result of the re-evaluation is not to retire the block, and indicating that the at least one block and/or the portion of a block is retired when the result of the re-evaluation is to retire the block.

In yet another general embodiment, a computer program product includes a computer readable storage medium having program instructions embodied therewith, the program instructions readable and/or executable by a controller to cause the controller to: determine, by the controller, that at least one block of the non-volatile memory and/or portion of a block of the non-volatile memory meets a retirement condition, re-evaluate, by the controller, the at least one block and/or the portion of a block to determine whether to retire the at least one block and/or the portion of a block, indicate, by the controller, that the at least one block and/or the portion of a block remains usable when a result of the re-evaluation is not to retire the block, and indicate, by the controller, that the at least one block and/or the portion of a block is retired when the result of the re-evaluation is to retire the block.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108 (such as ASICs, FPGAs, CPUs, etc.), which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, data erasing, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
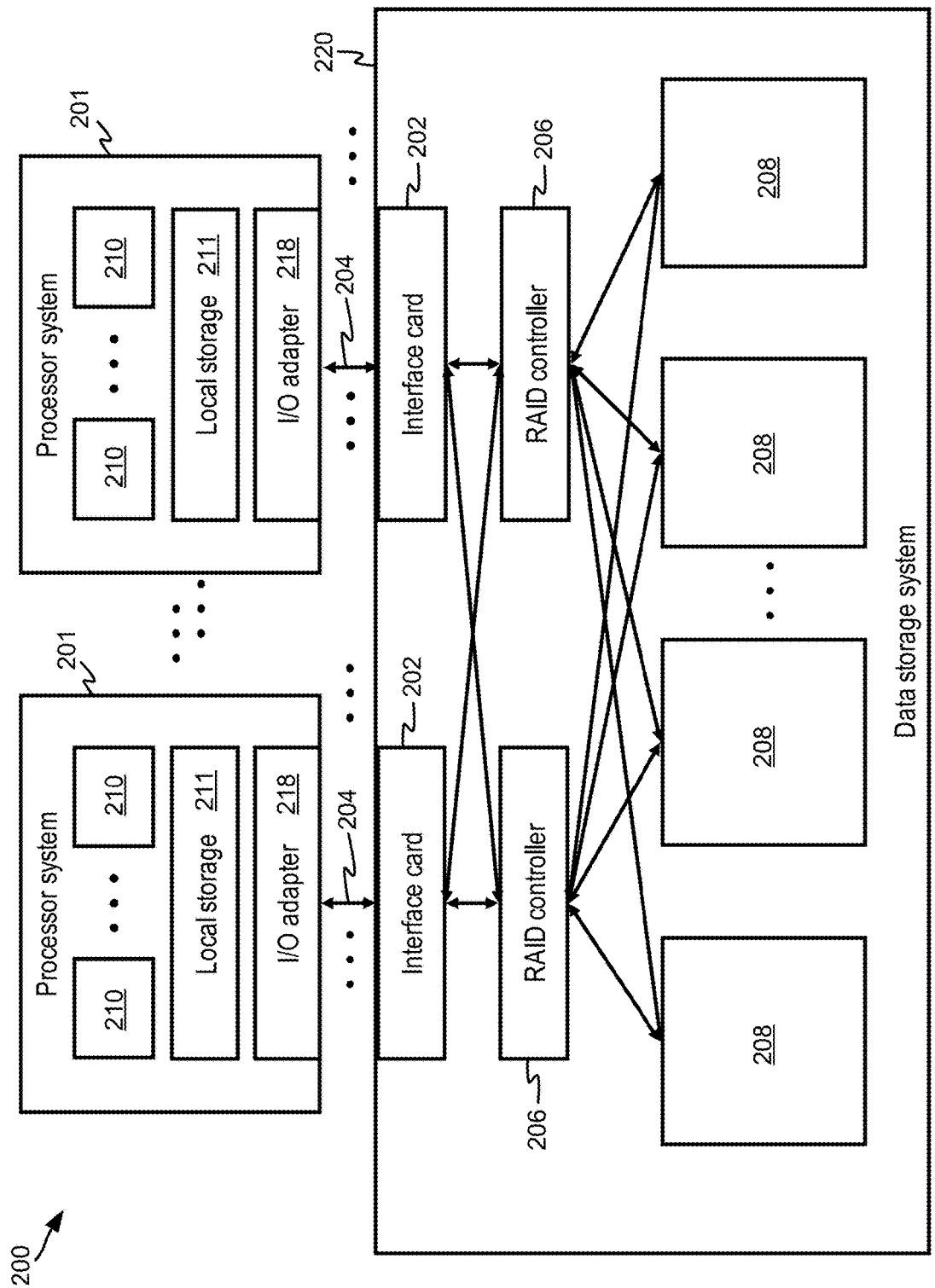
FIG. 2 shows a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 714 of FIG. 7, ROM 716 of FIG. 7, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, block-stripes may be identified for being reclaimed and/or relocated.

It should also be noted that a block-stripe includes any multiple of the physical memory block, which is a minimal physical unit of erasure. Moreover, the organization of memory blocks into block-stripes allows for adding RAID-like parity protection schemes among memory blocks from different memory chips, memory planes and/or channels as well as significantly enhancing performance through higher parallelism.

According to an exemplary embodiment, which is in no way intended to limit the invention, GPP 112 or memory controllers (e.g., see 108 of FIG. 1) may internally perform a garbage collection. As previously mentioned, the garbage collection may include selecting a block-stripe to be relocated, after which all data that is still valid on the selected block stripe may be relocated (e.g., moved). After the still valid data has been relocated, the entire block-stripe may be erased and thereafter, used for storing new data. The amount of data relocated from the garbage collected block-stripe determines the write amplification. Moreover, an efficient way to reduce the write amplification includes implementing heat segregation.

Heat Segregation

In the present context, the "heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

It should be noted that the number of read requests to and/or read operations performed on a memory block may not come into play when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat-segregated block-stripe tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same block-stripe as the hot data being relocated. Therefore the write amplification incurred by performing garbage collection is much lower for embodiments implementing heat segregation.

Secondly, the relative heat of data can be utilized for wear leveling purposes. For example, hot data may be placed in younger (e.g., healthier) memory blocks, while cold data may be placed on older (e.g., less healthy) memory blocks relative to those younger memory blocks. Thus, the rate at which relatively older blocks are exposed to wear is effectively slowed, thereby improving the lifetime of a given data storage system implementing heat segregation.

It follows that various embodiments described herein may preferably be implemented in combination with a NAND based memory controller which is capable of tracking the heat of data. For example, NAND based memory controllers described herein may be able to track the heat of logical and/or physical pages, memory blocks, etc. However, it should again be noted that various embodiments herein may be implemented with a wide range of memory mediums, e.g., NVRAM based SSD controllers, and the explicit description of NAND controllers is in no way intended to limit the invention.

Write Allocation

Write allocation includes placing data of write operations into free locations of open block-stripes. As soon as all pages in a block-stripe have been written, the block-stripe is closed and placed in a pool holding occupied block-stripes. Typically, block-stripes in the occupied pool become eligible for garbage collection. The number of open block-stripes is normally limited and any block-stripe being closed may be replaced, either immediately or after some delay, with a fresh block-stripe that is being opened.

During performance, garbage collection may take place concurrently with user write operations. For example, as a user (e.g., a host) writes data to a device, the device controller may continuously perform garbage collection on block-stripes with invalid data to make space for the new incoming data pages. As mentioned above, the block-stripes having the garbage collection being performed thereon will often have some pages that are still valid at the time of the garbage collection operation; thus, these pages are preferably relocated (e.g., written) to a new block-stripe.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
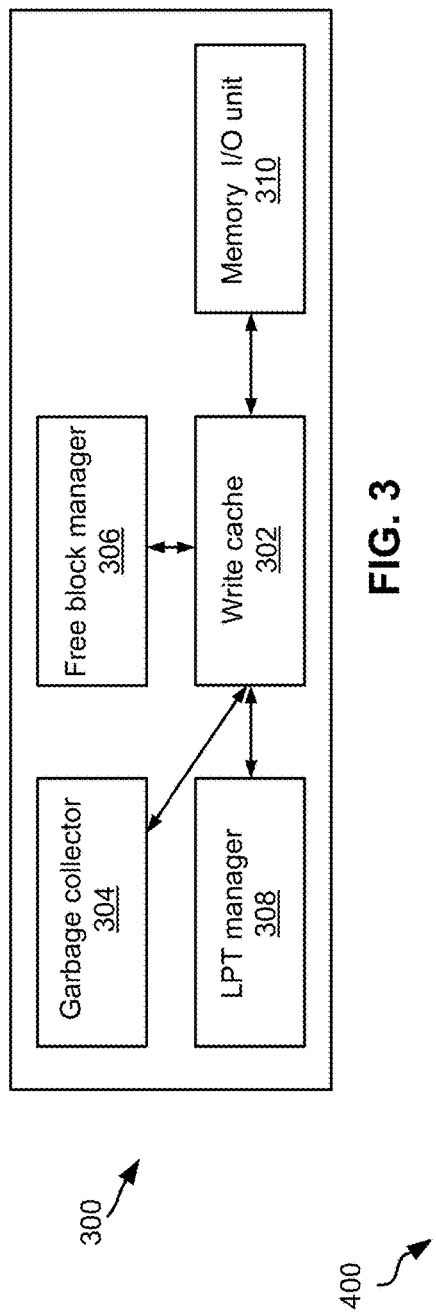
FIG. 3 is a non-volatile memory management system diagram in a non-volatile memory card, in accordance with one embodiment.

Referring now to FIG. 3, a non-volatile memory management system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, the non-volatile memory management system 300 includes a write cache 302 which is coupled to several other components, including garbage collector 304. As previously mentioned, garbage collector 304 may be used to free memory-blocks by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
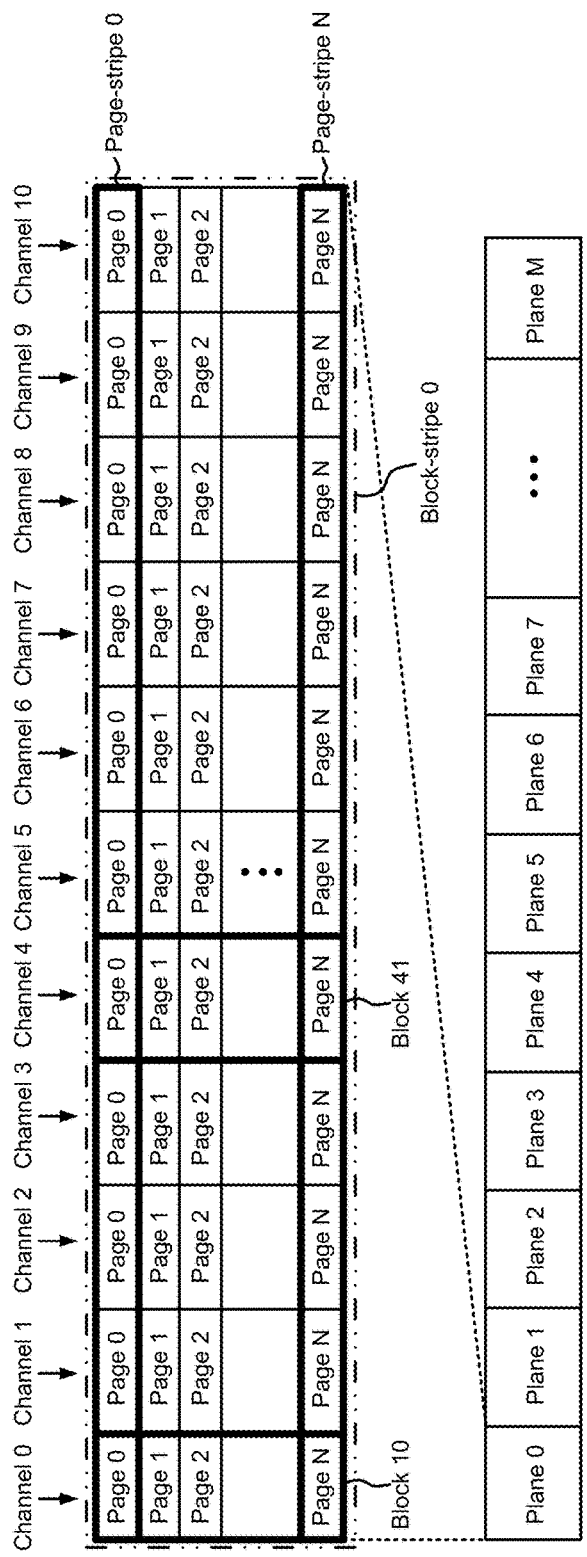
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. According to one example, as previously mentioned, it may be desired that non-volatile memory controller structures be replicated at the cache level of the various embodiments described herein. Thus, the exemplary non-volatile memory controller conceptual diagram 400 of FIG. 4 may be implemented in a cache architecture according to the desired embodiment.

Looking now to FIG. 4, the conceptual diagram 400 includes a set of M+1 planes labeled "Plane 0" through "Plane M". Each plane on a channel includes a large set of blocks, e.g., typically in the order of 1024, 2048 or more, and may also include several additional blocks which may be used as replacement blocks for bad blocks (e.g., blocks performing poorly, blocks having undesirable characteristics, etc.).

In each plane, a single block from each channel may form a respective block-stripe. It follows that a number of block-stripes supported by a given embodiment may be determined by the number of blocks per plane and channel.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated block-stripe holds N+1 page-stripes and each block therefore holds N+1 pages labeled "Page 0" through "Page N". In different embodiments, the number of pages in each block may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, units of memory which exhibit errors may be retired over time. Specifically, units of non-volatile memory which exhibit program errors, erase errors, a raw bit error rate (RBER) above a threshold for a given read operation, etc., may be assigned to a designated table (e.g., a bad block table) thereby retiring the portion of non-volatile memory from any future use. However, in certain instances, errors exhibited by a unit of non-volatile memory may be temporary. For example, although a given block of non-volatile memory may currently exhibit a high RBER, the RBER for the same block of non-volatile memory may later return to an acceptable level. This may result, for example, from a flawed field-programmable gate array (FPGA) which causes blocks to be falsely classified as pages exhibiting a higher RBER than they actually have.

Additional examples in which the errors exhibited by a unit of non-volatile memory may be temporary include instances in which the retirement error count limit for the unit of memory has been reached by coincidence (e.g., due to a particular data pattern), the unit of memory was not optimally calibrated, the configuration of a FPGA is altered but not implemented in the controller, the unit of memory returned a transient error (e.g., program or erase error) which may disappear with time and/or additional dwell time and/or additional erase operations, the unit of memory was used without respecting dwell times (e.g., due to heat segregation), etc.

It follows that retiring units of memory which exhibit error statuses that are temporary may result in reducing over-provisioning of the associated system, thereby causing an unnecessary increase in write amplification, decrease in the lifetime of the corresponding device, reorganization of memory, memory capacity reduction, etc.

In sharp contrast, various embodiments described and/or suggested herein include advanced endurance enhancement schemes. Some of the approaches described below introduce operations for performing a memory re-evaluation procedure, e.g., to reduce the number of prematurely (e.g., needlessly) retired blocks. It may be desirable for one or more operations of the memory re-evaluation procedure itself to not be executed in the data path. Thus, the advanced endurance enhancement schemes may be designed to run at least partially, but preferably fully, in the background, thereby allowing block re-evaluation to be performed at a limited rate without impacting data path processing, as will be described in further detail below. It follows that the various approaches described herein may be performed without undesirably inhibiting the implementation of health binning and/or grading, an error count margin, wear leveling, etc., or other memory management functions which would be appreciated by one skilled in the art upon reading the present description.

Figure 5:
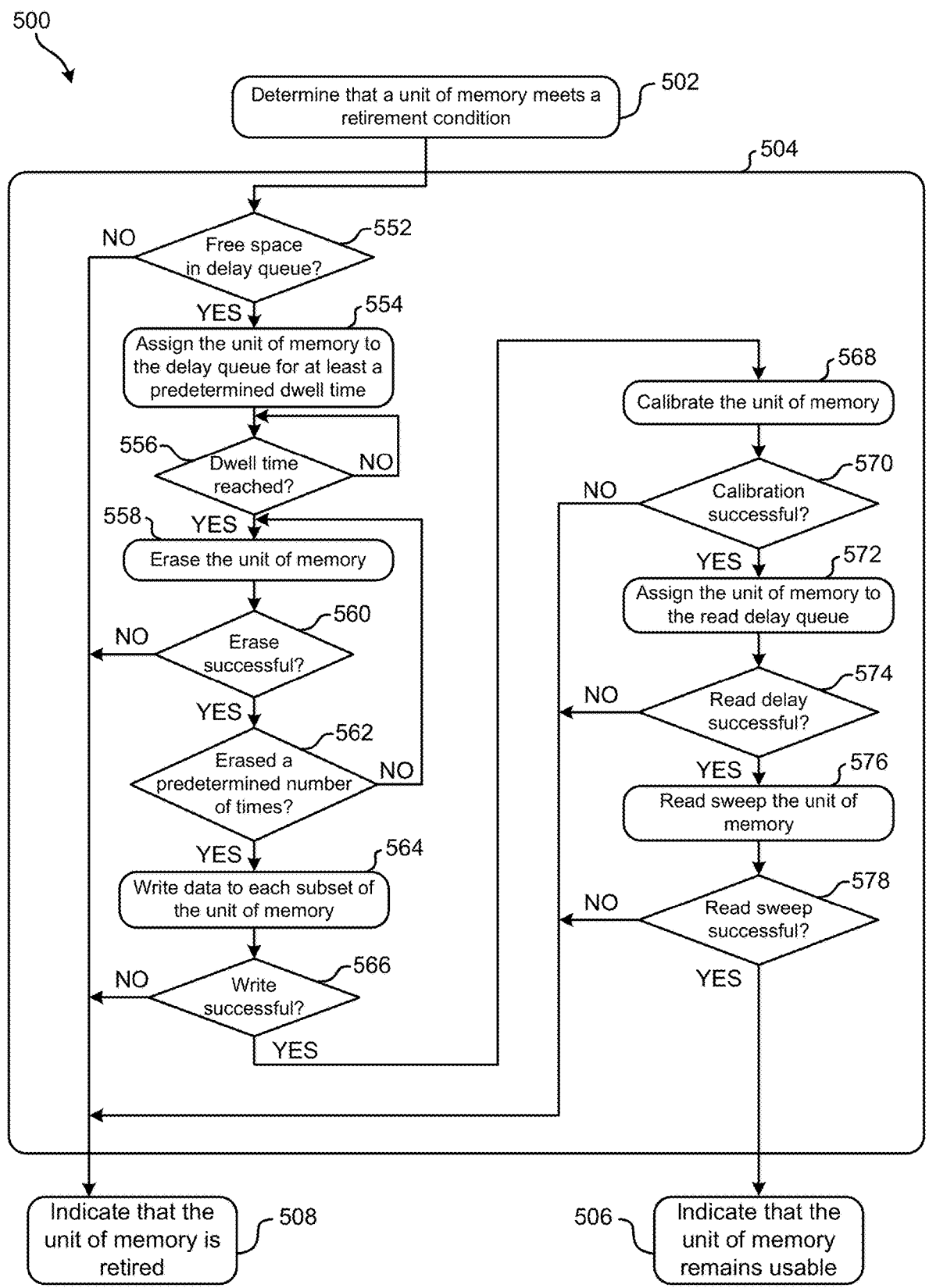
FIG. 5 is a flowchart of a method, in accordance with one embodiment.

FIG. 5 depicts a method 500 for re-evaluating one or more blocks of non-volatile memory (e.g., a single block, a block-stripe, multiple blocks, etc. as seen in FIG. 4) and/or a portion of a block of the non-volatile memory, preferably configured to store data, which have been designated for retirement, in accordance with one embodiment.

For simplicity, the one or more blocks of non-volatile memory and/or a portion of a block of the non-volatile memory are individually and/or collectively referred to herein as a "unit" or "units" of memory.

As an option, the present method 500 may be implemented in conjunction with features from any other embodiment listed herein, such as those described with reference to the other FIGS. However, such method 500 and others presented herein may be used in various applications and/or in permutations which may or may not be specifically described in the illustrative embodiments listed herein. Further, the method 500 presented herein may be used in any desired environment. Thus FIG. 5 (and the other FIGS.) may be deemed to include any possible permutation. It should be noted that, according to some embodiments, any one or more of the operations presented in method 500 may be performed by a GPP (e.g., see 112 of FIG. 1) and/or a controller (e.g., see 108 of FIG. 1) and logic integrated with and/or executable by the controller.

Referring now to FIG. 5, method 500 includes determining that a unit of memory meets a retirement condition. See operation 502. As previously mentioned, the retirement condition may correspond to program errors, erase errors, a RBER above a threshold for a given read operation (e.g., a page read), etc.

According to one approach, the non-volatile memory may include NAND Flash memory, but is in no way limited thereto. Again, it should be understood that various embodiments herein can be implemented with a wide range of memory mediums, including for example NVRAM technologies such as NAND Flash memory, NOR Flash memory, phase-change memory (PCM), magnetoresistive RAM (MRAM) and resistive RAM (RRAM) as would be appreciated by one skilled in the art upon reading the present description.

Upon determining that a unit of memory meets a retirement condition, operation 504 includes re-evaluating the unit of memory to determine whether to retire the unit of memory. Again, the unit of memory may include at least one block of non-volatile memory (e.g., a single block, multiple blocks, a block-stripe, etc.) and/or a portion of a block of the non-volatile memory (e.g., one or more pages). Thus, embodiments implementing re-evaluation at the page level (the unit of memory includes one or more pages) may implement page level retirement in combination with the various approaches described and/or suggested herein. It follows that, as single pages are retired, the full size of the non-volatile memory block associated with the retired one or more pages will decrease accordingly.

Depending on the result of the re-evaluation performed in operation 504, method 500 may advance along different paths. Specifically, when it is determined in operation 504 that a result of the re-evaluation is to not retire the unit of memory, method 500 proceeds to operation 506 which includes indicating that the unit of memory remains usable. For example, operation 506 may include assigning the unit of memory in the ready to erase (RTE) queue, list the unit of memory in a table of good blocks, etc.

However, when it is determined in operation 504 that a result of the re-evaluation is to retire the unit of memory, method 500 proceeds to operation 508 which includes indicating that the unit of memory is retired. Upon being retired, the unit of memory may be assigned to a designated table thereby retiring the portion of non-volatile memory from any future use, as will be described in further detail below.

Depending on the desired embodiment, the re-evaluation performed in operation 504 may include a number of operations. The order in which some of the operations are performed may also vary depending on the particular approach. Referring now specifically to the operations and decisions outlined in re-evaluation operation 504, an exemplary flowchart of processes which may be performed during the re-evaluation process of a unit of memory is presented, but is in no way intended to be limited thereto. Moreover, any combination of such operations and/or decisions may be implemented and/or omitted in a particular embodiment. The operations and decisions outlined in re-evaluation operation 504 may be used to determine whether the corresponding unit of memory should be retired (e.g., permanently) or reused as described above.

Referring still to FIG. 5, upon determining that a unit of memory (e.g., at least one block and/or a portion of a block) meets a retirement condition, method 500 proceeds to decision 552. Decision 552 includes determining whether there is an adequate amount of free space in a delay queue to accommodate the unit of memory, e.g., to perform a re-evaluation thereof. When it is determined that an adequate amount of free space does not exist in the delay queue, method 500 advances directly from decision 552 to operation 508 which includes indicating that the unit of memory is retired. Thus, a lack of free space in the delay queue may result in the automatic retirement of units of memory that may otherwise successfully pass the re-evaluation of operation 504 and remain usable. It follows that an adequate amount of free space in the delay queue is desirable.

Accordingly, when decision 552 determines that there is an adequate amount of free space in the delay queue to accommodate the unit of memory, method 500 proceeds to operation 554 which includes assigning the unit of memory to the delay queue for at least a predetermined dwell time. Depending on the embodiment, "dwell time" may refer to the time between programmings, erases, etc., or the time between any other actions performed on a given unit of memory. Thus, different implementations of the operations in method 500 may rely on different definitions of dwell time.

Units of memory which have high error rates may recover when allowed to experience longer dwell times. According to an example, which is in no way intended to limit the invention, if a block of non-volatile memory is subjected to harsh operating conditions (e.g., rapid cycling) at the beginning of its life, but later, the block is allowed to experience ample dwell time, the block may recover from the harsh operating conditions experienced during its beginning of life and behave normally during subsequent use. Thus, it is desirable that there is an ample amount of time between programming cycles performed on non-volatile memory, which may be derived from the specification of the memory, as a result of routine experimentation, etc.

By remaining in the delay queue for at least a fixed amount of time, the unit of memory undergoes additional dwell time which it might not otherwise have experienced prior to meeting a retirement condition. As a result, the condition of the unit of memory may improve and thereby no longer be subject to retirement.

Desired dwell times may vary depending on the type of memory, the age of the memory, the size of the unit of memory, operating temperatures, etc. Dwell times specific to a given embodiment may be gleaned from a lookup table which may be stored in memory. According to an illustrative example, which is in no way intended to limit the invention, a desired dwell time for a particular 19 nm multi-level cell (MLC) NAND flash memory may be 1678 sec (about 30 min) at a 40° C. operating temperature, which is equivalent to 260 sec (about 4.3 min) at a 55° C. testing temperature, or 13,076 sec (about 218 min) at room temperature (25° C.). Again, these dwell times are presented for a particular type of memory by way of example only, and are in no way intended to limit the invention. Preferably, the dwell time assigned to a given unit of memory is long enough to allow for any improvements in the unit of memory to occur. Thus, units of memory which do not have a particular dwell time associated therewith may be assigned a standard dwell time of about 4 hours, but could be longer or shorter depending on the desired embodiment.

The rate at which units of memory may be re-evaluated is typically slow, e.g., because the dwell time imposed on each unit of memory is preferably long enough to induce improvements therein. Moreover, the delay queue size is fixed. Thus, if additional units of memory are received to be re-evaluated while the delay queue is full, those additional units of memory may be automatically retired as previously mentioned. However, the low rate and implementation in the background desirably allows for minimal impact on normal operations.

With continued reference to FIG. 5, following operation 554, decision 556 determines whether at least the predetermined dwell time has been reached. If the dwell time has not yet been reached, method 500 continues to repeat the determination made in decision 556 until at least the predetermined dwell time has been reached. The actual process of performing the repeated determination may give back (e.g., surrender) control of the processor such that other non-volatile memory management tasks may be performed in-between iterations. It follows that the size of the delay queue and the corresponding dwell time in the delay queue may be fixed for a given embodiment. As a result, the rate at which units of memory are removed from the delay queue may be fixed as well.

Once it is determined that the predetermined dwell time has elapsed, method 500 continues to operation 558 which includes erasing the unit of memory. The actual process of erasing the unit of memory may be performed asynchronously by firmware. According to one approach, firmware code may issue the erasure of operation 558 and subsequently continue processing other management tasks before returning at a later point in time to determine whether the erasure of operation 558 has been completed.

After executing operation 558, method 500 proceeds to decision 560 which determines whether the erase was performed successfully on the unit of memory. When it is determined that the erase was not performed successfully, method 500 may advance directly from decision 560 to operation 508, thereby indicating that the unit of memory is retired. According to the present embodiment, a single erase failure may result in the retirement of the unit of memory. However, according to alternate embodiments, a unit of memory may be retired after two erase failures, three erase failures, etc., depending on the desired approach. In such embodiments, the number of erase failures for a given unit of memory may be stored in a lookup table, e.g., to be compared to a threshold upon each iteration of performing decision 560.

Referring still to FIG. 5, when decision 560 determines that the erase was performed successfully, method 500 proceeds to decision 562. Decision 562 determines whether the current unit of memory has been erased at least a predetermined number of times. According to an exemplary approach, decision 562 may determine whether the unit of memory has been erased three times, however according to other approaches, decision 562 may determine whether the unit of memory has been erased one, two, four, five, N, etc. times. Multiple erase operations performed on a unit of memory may improve the condition of the unit of memory, preferably to the extent that it no longer meets a retirement condition. The number of erase operations performed on a unit of memory may be stored in a lookup table, whereby decision 562 may access the lookup table to determine whether the unit of memory has been erased at least the predetermined number of times.

When decision 562 determines that the unit of memory has not been erased at least the predetermined number of times, method 500 returns to operation 558 whereupon the unit of memory is again erased. It should be noted that decision 560 is preferably performed proceeding each erasure of the unit of memory, and accordingly, method 500 may be directed to operation 508 when any one or more of the erase operations 558 are unsuccessful. For example, depending on quality control, sensitivity of data, etc., method 500 may be directed to operation 508 upon one, two, three, etc. unsuccessful erase operation(s) as described above.

However, when decision 562 determines that the unit of memory has been successfully erased at least the predetermined number of times, method 500 proceeds to operation 564 which includes writing data to each subset of the unit of memory. For example, if the unit of memory corresponds to a block of non-volatile memory, operation 564 may include writing data to all pages of the block of memory. Furthermore, in some approaches operation 564 may also include only writing data to each subset of valid pages in the block, e.g., when page-level retirement is used. Depending on the approach, the data written to each subset of the unit of memory may be predefined, random, pseudo random, etc.

Similar to operation 558, the actual process of writing data to the unit of memory may be performed asynchronously by firmware in the sense that firmware code may issue the writing of operation 564 and subsequently continue processing other management tasks before returning at a later point in time to determine whether operation 564 has been completed.

After completing operation 564, method 500 advances to decision 566 which determines whether the write procedure of operation 564 was performed successfully. When decision 566 determines that one or more write error occurs during the write procedure (the write procedure was unsuccessful), method 500 proceeds to operation 508 whereby the result of the re-evaluation is to retire the unit of memory from any future use. An unsuccessful write procedure may result when a number of write errors for one or more of the subunits of the unit of memory is greater than an accepted threshold.

However, when decision 566 determines the write procedure was successful, method 500 proceeds to operation 568 which includes performing a calibration of the unit of memory. According to different approaches, the success of the write procedure may correspond to situations in which no write errors occur during the write procedure, a number of write errors below a given threshold occur during the write procedure, etc.

As previously mentioned, operation 568 includes performing a calibration of the unit of memory. The process of calibrating the unit of memory may include, but is in no way limited to, determining the optimal threshold voltage shift values. Implementing the optimal threshold voltage shift values may consequently minimize the number of errors encountered upon performing a read operation on the unit of memory. Thus, it is preferred that a unit of memory is calibrated before being read.

Depending on the desired approach, different types of calibration may be performed on a given unit of memory. For example, "normal calibration" may be performed by reading all pages in the unit of memory (e.g., block of non-volatile memory) with a small set of different threshold voltage shift levels. Furthermore, the number of read operations performed per page of the unit of memory is preferably minimal, e.g., typically 3 read operations.

Alternatively, "fast calibration" includes a calibration method in which a limited amount of pages are read (e.g., at least a number of pages less than read using a normal calibration process) in order to perform the calibration process on a unit of memory. By limiting the number of pages read during fast calibrations, the number of read operations performed is significantly reduced compared to normal calibration processes.

Further still, "extensive calibration" performs read operations using a large set of different threshold voltage shift values as would be appreciated by one skilled in the art upon reading the present description. For example, in some approaches, the large set of different threshold voltage shift values may preferably include all possible threshold voltage shift values. Extensive calibration processes may be desired when the previous threshold voltage shift values are either not available or known to be not suitable.

Depending on the embodiment, it may be desirable to reduce the overall system load resulting from performing a re-evaluation. Thus, the calibrations performed in operation 568 may primarily be fast calibrations. However, normal and/or extensive calibration operations may be executed when certain block conditions indicate normal and/or extensive calibration would be preferable (e.g., data is uncorrectable with current threshold voltage shift values, etc.). Moreover, the results (e.g., threshold voltage shift values) of a calibration procedure may be stored in a lookup table and/or appended to existing values for the unit of memory.

After operation 568, method 500 proceeds to decision 570 which includes determining whether the calibration of operation 568 was performed successfully. When decision 570 determines that a number of calibration errors (e.g., correctable and/or uncorrectable) experienced during the calibration of operation 568 exceeds a retirement error count limit, it may be determined that the calibration of operation 568 was unsuccessful. As a result of the unsuccessful calibration, method 500 may proceed to operation 508 whereby the result of the re-evaluation is to retire the unit of memory, e.g., from any future use.

However, when decision 570 determines the calibration was successful, method 500 proceeds to operation 572. Accordingly, the success of the calibration procedure may correspond to situations in which a number of calibration errors associated with the calibration process performed on the unit of memory does not exceed a retirement error count limit.

Referring still to method 500, operation 572 includes assigning the unit of memory in a read delay queue. Similar to the delay queue introduced above in the description of operation 554, the read delay queue may also have a fixed size and delay time. In preferred approaches, the read delay queue size (e.g., depth) and the read delay time may be large enough to ensure ample space in the read delay queue to accommodate incoming memory units. This may be achieved by ensuring that the read delay queue size is at least the same size as the first delay queue (facilitating dwell times) in addition to ensuring that the rate at which queued units of memory are taken out of the read delay queue is equal-to, or greater than, the rate at which queued units of memory are removed from the first delay queue. As a result, the free space available in the read delay queue will be able to accommodate the units of memory sent downstream from the first delay queue at a given time. Moreover, the read delay queue may desirably be protected from an overflow of incoming units of memory read delay requests.

Following operation 572, decision 574 includes determining whether the read delay performed in operation 572 was done successfully. When it is determined that the read delay was not performed successfully, decision 574 directs the flow of method 500 to operation 508 whereby the result of the re-evaluation is to retire the unit of memory, e.g., from any future use. Alternatively, when it is determined that operation 572 has been performed successfully, method 500 proceeds to operation 576 which includes performing a read sweep on the unit of memory.

The read sweep performed on the unit of memory may conduct a read scrubbing of the data written thereto, e.g., using the current optimal threshold voltage shift values associated therewith. By performing a read sweep on the unit of memory, it may be determined if data can be read from the memory and/or whether the RBER of any subsets (pages) of the unit of memory exceeds the aforementioned threshold. Accordingly, the read sweep preferably reads back the data previously written to the unit of memory during operation 564. While reading the data written to each sub-unit of the memory (e.g., to each page of a block of non-volatile memory), the number of errors encountered are accumulated and may be stored in memory, e.g., a lookup table. Alternatively, the read sweep procedure may also include an additional calibration of the memory unit.

When the read sweep of operation 576 results in a number of read errors which exceeds a retirement error count limit, decision 578 may determine to advance method 500 to operation 508 whereby the result of the re-evaluation is to retire the unit of memory. Alternatively, if decision 578 determines that the read sweep of operation 576 was performed with adequate success (e.g., such that no read errors occurred, a number of read errors below a retirement error count limit occurred, etc.), method 500 is advanced to operation 506.

Upon reaching operation 506, it may be determined that the unit of memory successfully passed the re-evaluation procedure. A unit of memory which successfully passes a re-evaluation procedure, e.g., such as the one illustrated in operation 504 of FIG. 5, may be re-established as usable memory and thereby reintroduced into the system, e.g., for absorbing new write operations. According to different embodiments, operation 506 may include indicating that the unit of memory is to be placed in a RTE queue, list it in a table of good blocks, etc.

The number of times a given unit of memory may be re-evaluated, e.g., implementing method 500, may be limited depending on the desired approach. In some approaches, a block of non-volatile memory may be re-evaluated only once before being automatically retired when designated for retirement a second time. However, in other approaches, a block of non-volatile memory may be re-evaluated twice, three times, four times, N times, etc., before being automatically retired. The number of times a unit of memory may be re-evaluated may depend on the sensitivity of the data stored in the memory, an age of the memory, the memory type, etc.

Certain operations and/or decisions presented above may not be performed during a given implementation of method 500. Additionally, the order in which the different operations and/or decisions are performed may vary depending on the desired embodiment. According to an in-use example, which is in no way intended to limit the invention, the calibration performed in operation 568 as well as decision 570 may be performed after the read sweep of operation 576 and decision 578 are performed. As a result of this alternate order of operations, the read sweep counter may be used to decide which type of calibration is performed in operation 568. For example, depending on the results of the read sweep, the calibration performed thereafter in operation 568 may be chosen to be a fast calibration, a normal calibration or an extensive calibration. According to yet another example, if the read sweep test exhibits an extremely low error count, operation 568 may be skipped altogether thereby not calibrating the unit of memory.

It follows that some of the operations and/or decisions may be reordered with respect to the others and/or executed one or more times at different positions in the flow chart of method 500. However, the interdependence between certain processes may be desirable. For example, it is preferred that a unit of memory is erased before data is written thereto. According to another example, it is preferred that a unit of memory is written to before it is calibrated. However, in one embodiment, a unit of memory may be erased and written to, after which the unit of memory may be placed in the delay queue for at least a predetermined dwell time. It follows that one skilled in the art would appreciate the appropriate order in which the various operations and/or decisions presented herein are performed.

As previously mentioned, the endurance enhancement schemes described herein are preferably designed to run at least partially, but preferably fully, in the background, thereby allowing block re-evaluation to be performed at a limited rate without impacting data path processing. It follows that the various approaches described herein may be performed asynchronously without undesirably inhibiting the implementation of health binning and/or grading, an error count margin, wear leveling, etc., or other memory management functions which would be appreciated by one skilled in the art upon reading the present description.

Thus, all operations and decisions of method 500 may not be processed in immediate succession, but rather parts of the processes may be performed at given times, after delays, upon availability of the appropriate resources, etc. For example, a controller may attempt to minimize sacrifice of the performance of other processes, e.g., by performing operations and/or decisions of method 500 at times of low latency. It follows that the execution of method 500 may stop and start at different points along the path of performing the re-evaluation for a given unit of memory depending on particular operating conditions.

It should also be noted that the number of processes processed in the background may be limited, and therefore it is typically undesirable, but in no way impossible, to perform all operations and decisions of method 500 in immediate succession. According to an exemplary approach, one or more of the operations and/or decisions performed in method 500 may be performed by a background health checker of an operating system, e.g., such as the one illustrated in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 6:
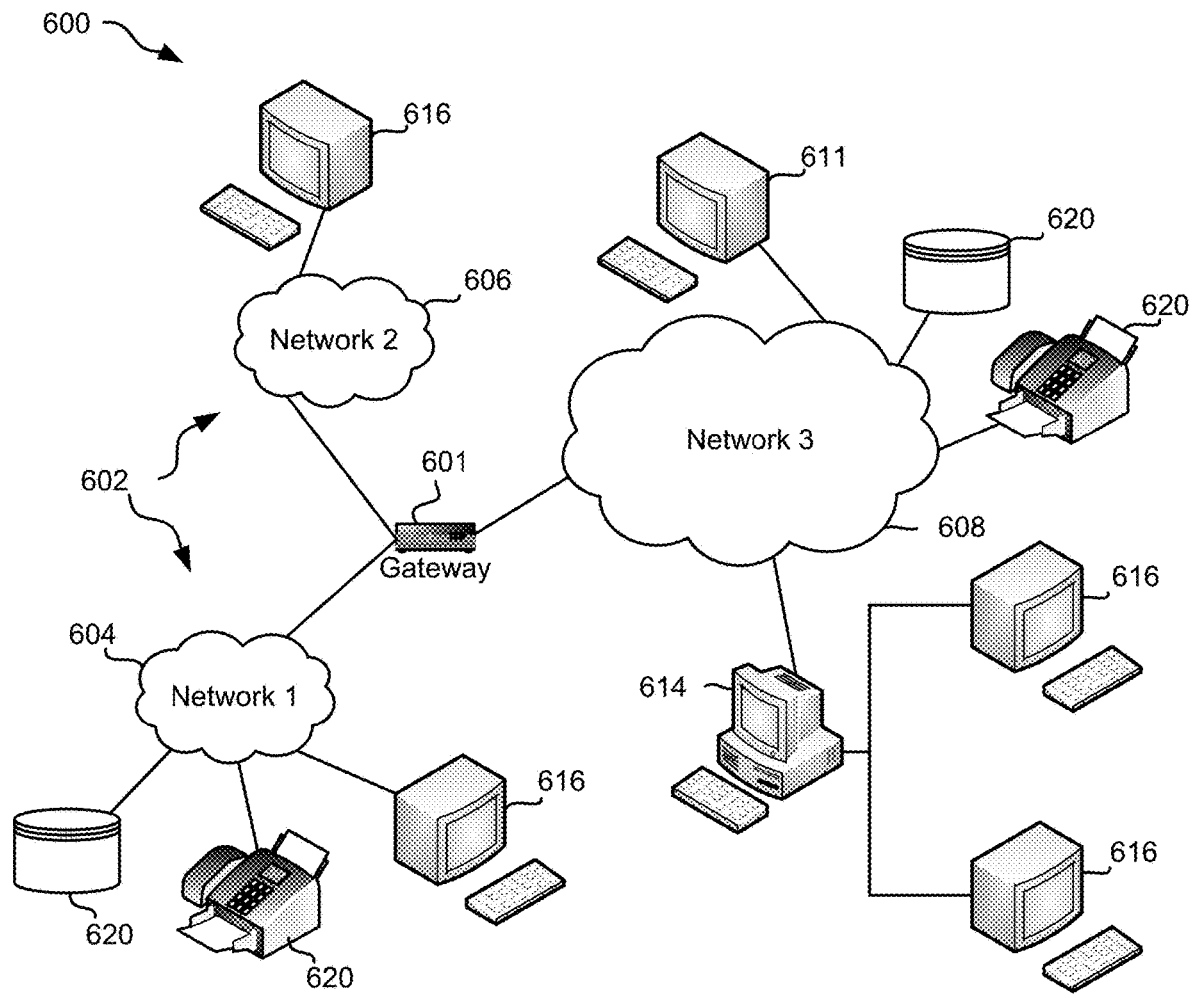
FIG. 6 is a network architecture, in accordance with one embodiment.

FIG. 6 illustrates a network architecture 600, in accordance with one embodiment. As shown in FIG. 6, a plurality of remote networks 602 are provided including a first remote network 604 and a second remote network 606. A gateway 601 may be coupled between the remote networks 602 and a proximate network 608. In the context of the present network architecture 600, the networks 604, 606 may each take any form including, but not limited to a LAN, a WAN such as the Internet, public switched telephone network (PSTN), internal telephone network, etc.

In use, the gateway 601 serves as an entrance point from the remote networks 602 to the proximate network 608. As such, the gateway 601 may function as a router, which is capable of directing a given packet of data that arrives at the gateway 601, and a switch, which furnishes the actual path in and out of the gateway 601 for a given packet.

Further included is at least one data server 614 coupled to the proximate network 608, and which is accessible from the remote networks 602 via the gateway 601. It should be noted that the data server(s) 614 may include any type of computing device/groupware. Coupled to each data server 614 is a plurality of user devices 616. Such user devices 616 may include a desktop computer, laptop computer, handheld computer, printer, and/or any other type of logic-containing device. It should be noted that a user device 611 may also be directly coupled to any of the networks, in some embodiments.

A peripheral 620 or series of peripherals 620, e.g., facsimile machines, printers, scanners, hard disk drives, networked and/or local data storage units or systems, etc., may be coupled to one or more of the networks 604, 606, 608. It should be noted that databases and/or additional components may be utilized with, or integrated into, any type of network element coupled to the networks 604, 606, 608. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 604, 606, 608, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 7:
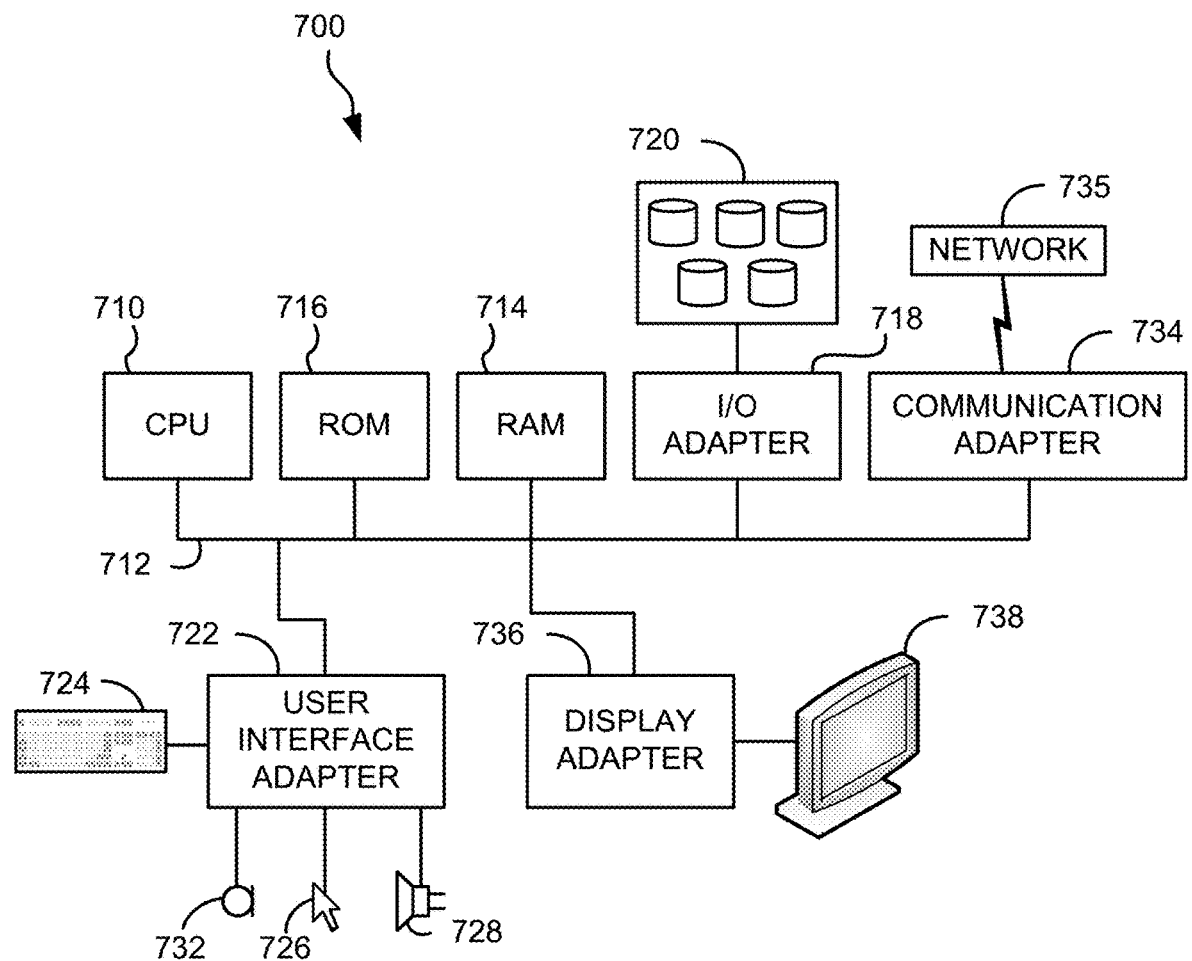
FIG. 7 is a representative hardware environment that may be associated with the servers and/or clients of FIG. 6, in accordance with one embodiment.

FIG. 7 shows a representative hardware environment associated with a user device 616 and/or server 614 of FIG. 6, in accordance with one embodiment. FIG. 7 illustrates a typical hardware configuration of a processor system 700 having a central processing unit 710, such as a microprocessor, and a number of other units interconnected via a system bus 712, according to one embodiment. In some embodiments, central processing unit 710 may include any of the embodiments described above with reference to the one or more processors 210 of FIG. 2.

The processor system 700 shown in FIG. 7 includes a Random Access Memory (RAM) 714, Read Only Memory (ROM) 716, and an I/O adapter 718. According to some embodiments, which are in no way intended to limit the invention, I/O adapter 718 may include any of the embodiments described above with reference to I/O adapter 218 of FIG. 2. Referring still to processor system 700 of FIG. 7, the aforementioned components 714, 716, 718 may be used for connecting peripheral devices such as storage subsystem 720 to the bus 712. In some embodiments, storage subsystem 720 may include a similar and/or the same configuration as data storage system 220 of FIG. 2. According to an example, which is in no way intended to limit the invention, storage subsystem 720 may include non-volatile data storage cards, e.g., having Flash memory cards, RAM, ROM, and/or some other known type of non-volatile memory, in addition to RAID controllers as illustrated in FIG. 2.

With continued reference to FIG. 7, a user interface adapter 722 for connecting a keyboard 724, a mouse 726, a speaker 728, a microphone 732, and/or other user interface devices such as a touch screen, a digital camera (not shown), etc., to the bus 712.

Processor system 700 further includes a communication adapter 734 which connects the processor system 700 to a communication network 735 (e.g., a data processing network) and a display adapter 736 which connects the bus 712 to a display device 738.

The processor system 700 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 8:
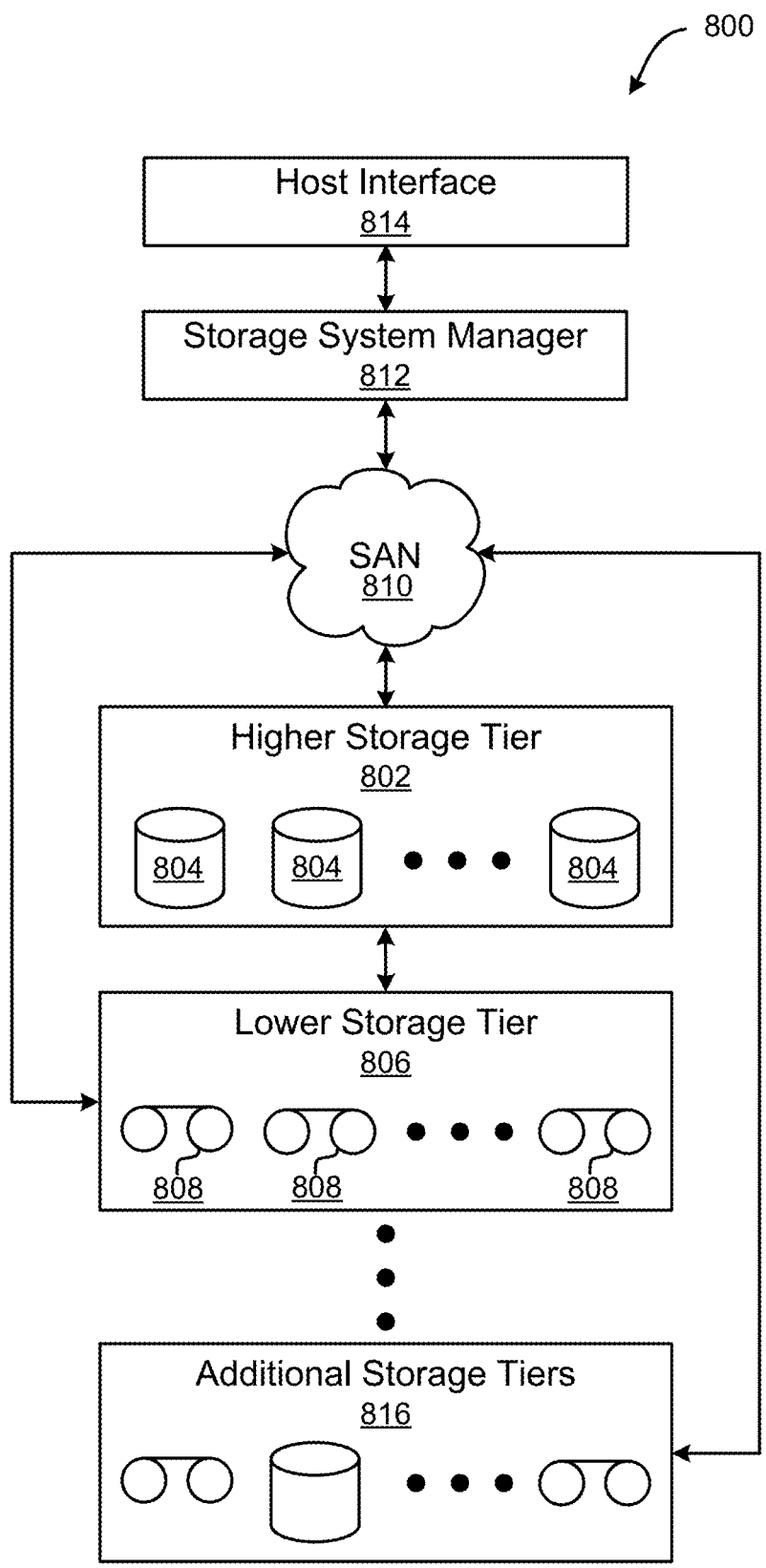
FIG. 8 is a tiered data storage system in accordance with one embodiment.

Moreover, FIG. 8 illustrates a storage system 800 which implements high level (e.g., SSD) storage tiers in combination with lower level (e.g., magnetic tape) storage tiers, according to one embodiment. Note that some of the elements shown in FIG. 8 may be implemented as hardware and/or software, according to various embodiments. The storage system 800 may include a storage system manager 812 for communicating with a plurality of media on at least one higher storage tier 802 and at least one lower storage tier 806. However, in other embodiments, a storage system manager 812 may communicate with a plurality of media on at least one higher storage tier 802, but no lower storage tier. The higher storage tier(s) 802 preferably may include one or more random access and/or direct access media 804, such as hard disks, nonvolatile memory (NVM), solid state memory in SSDs, Flash memory, SSD arrays, Flash memory arrays, etc., and/or others noted herein or known in the art. According to illustrative examples, FIGS. 3-4 show exemplary architectures of SSD systems which may be used as a higher storage tier 802 depending on the desired embodiment.

Referring still to FIG. 8, the lower storage tier(s) 806 preferably includes one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Thus the one or more additional storage tiers 816 may, in some embodiments, include a SSD system architecture similar or the same as those illustrated in FIGS. 1-2. Also, any of the higher storage tiers 802 and/or the lower storage tiers 806 may include any combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. However, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. However, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions.

Of course, this logic may be implemented as a method on any device and/or system or as a computer program product, according to various embodiments.

What is claimed is:

1. An apparatus, comprising:
   non-volatile memory configured to store data; and
   a controller and logic integrated with and/or executable by the controller, the logic being configured to:
   determine, by the controller, that at least one block of the non-volatile memory and/or portion of a block of the non-volatile memory meets a retirement condition;
   re-evaluate, by the controller, the at least one block and/or the portion of a block to determine whether to retire the at least one block and/or the portion of a block;
   indicate, by the controller, that the at least one block and/or the portion of a block remains usable in response to a result of the re-evaluation being to not retire the block; and
   indicate, by the controller, that the at least one block and/or the portion of a block is retired in response to the result of the re-evaluation being to retire the block,
   wherein the re-evaluating includes:
   assigning the at least one block and/or the portion of a block into a delay queue for at least a dwell time and/or a read delay, and
   in response to assigning the at least one block and/or the portion of a block into the delay queue for at least the dwell time and/or the read delay, calibrating the at least one block and/or the portion of a block by determining an optimal threshold voltage shift value for each of the at least one block and/or the portion of a block.

2. The apparatus as recited in claim 1, wherein the re-evaluating includes performing one or more erase operations on the at least one block and/or the portion of a block, wherein the result of the re-evaluation is to retire the at least one block and/or the portion of a block in response to any of the one or more erase operations failing.

3. The apparatus as recited in claim 1, wherein the result of the re-evaluation is to retire the at least one block and/or the portion of a block in response to a number of calibration errors exceeding a retirement error count limit.

4. The apparatus as recited in claim 1, wherein the re-evaluating includes performing a read sweep on the at least one block and/or the portion of a block, wherein the result of the re-evaluation is to retire the at least one block and/or the portion of a block in response to a number of read errors exceeding a retirement error count limit.

5. The apparatus as recited in claim 1, wherein the re-evaluating includes:
   performing one or more erase operations on the at least one block and/or the portion of a block;
   writing data to the at least one block and/or the portion of a block, wherein the result of the re-evaluation is to retire the at least one block and/or the portion of a block in response to one or more write error occurring; and
   performing a read sweep on the at least one block and/or the portion of a block.

6. The apparatus as recited in claim 1, wherein the non-volatile memory includes NAND Flash memory, wherein the re-evaluating is performed in response to determining that the at least one block of the non-volatile memory and/or portion of the block of the non-volatile memory meets the retirement condition.

7. The apparatus as recited in claim 1, wherein the re-evaluating includes an operation selected from the group consisting of:
   performing one or more erase operations on the at least one block and/or the portion of a block;
   writing data to the at least one block and/or the portion of a block; and
   performing a read sweep on the at least one block and/or the portion of a block.

8. A computer-implemented method, comprising:
   determining, by a computer, that at least one block of a non-volatile memory and/or portion of a block of the non-volatile memory meets a retirement condition;
   re-evaluating, by the computer, the at least one block and/or the portion of a block to determine whether to retire the at least one block and/or the portion of a block;
   indicating, by the computer, that the at least one block and/or the portion of a block remains usable when a result of the re-evaluation is not to retire the block; and
   indicating, by the computer, that the at least one block and/or the portion of a block is retired when the result of the re-evaluation is to retire the block,
   wherein the re-evaluating includes:
      assigning the at least one block and/or the portion of a block into a delay queue for at least a dwell time and/or a read delay, and
      in response to assigning the at least one block and/or the portion of a block into the delay queue for at least the dwell time and/or the read delay, performing a calibration of the at least one block and/or the portion of a block by determining an optimal threshold voltage shift value for each of the at least one block and/or the portion of a block.

9. The method as recited in claim 8, wherein the re-evaluating includes performing one or more erase operations on the at least one block and/or the portion of a block, wherein the result of the re-evaluation is to retire the at least one block and/or the portion of a block in response to any of the one or more erase operations failing.

10. The method as recited in claim 8, wherein the re-evaluating includes writing data to the at least one block and/or the portion of a block, wherein the result of the re-evaluation is to retire the at least one block and/or the portion of a block in response to one or more write error occurring.

11. The method as recited in claim 8, wherein the re-evaluating includes performing a read sweep on the at least one block and/or the portion of a block, wherein the result of the re-evaluation is to retire the at least one block and/or the portion of a block in response to a number of read errors exceeding a retirement error count limit.

12. The method as recited in claim 8, wherein the re-evaluating includes:
   performing one or more erase operations on the at least one block and/or the portion of a block;
   writing data to the at least one block and/or the portion of a block; and
   performing a read sweep on the at least one block and/or the portion of a block,
   wherein the result of the re-evaluation is to retire the at least one block and/or the portion of a block when a number of calibration errors exceeds a retirement error count limit.

13. The method as recited in claim 8, wherein the non-volatile memory includes NAND Flash memory, wherein the re-evaluating is performed in response to determining that the at least one block of the non-volatile memory and/or portion of the block of the non-volatile memory meets the retirement condition.

14. The computer-implemented method as recited in claim 8, wherein the re-evaluating includes an operation selected from the group consisting of:
   performing one or more erase operations on the at least one block and/or the portion of a block;
   writing data to the at least one block and/or the portion of a block; and
   performing a read sweep on the at least one block and/or the portion of a block.

15. A computer program product comprising a computer readable storage medium having program instructions embodied therewith, the program instructions readable and/or executable by a controller to cause the controller to:
   determine, by the controller, that at least one block of a non-volatile memory and/or portion of a block of the non-volatile memory meets a retirement condition;
   re-evaluate, by the controller, the at least one block and/or the portion of a block to determine whether to retire the at least one block and/or the portion of a block, wherein the re-evaluating includes:
      assigning the at least one block and/or the portion of a block into a delay queue for at least a dwell time and/or a read delay, and
      in response to assigning the at least one block and/or the portion of a block into the delay queue for at least the dwell time and/or the read delay, calibrating the at least one block and/or the portion of a block by determining an optimal threshold voltage shift value for each of the at least one block and/or the portion of a block;
   indicate, by the controller, that the at least one block and/or the portion of a block remains usable in response to a result of the re-evaluation being to not retire the block; and
   indicate, by the controller, that the at least one block and/or the portion of a block is retired in response to the result of the re-evaluation being to retire the block.

16. The computer program product as recited in claim 15, wherein the re-evaluating includes at least one of:
   performing one or more erase operations on the at least one block and/or the portion of a block;
   writing data to the at least one block and/or the portion of a block; and
   performing a read sweep on the at least one block and/or the portion of a block.

17. The computer program product as recited in claim 15, wherein the re-evaluating includes:

performing one or more erase operations on the at least one block and/or the portion of a block;

writing data to the at least one block and/or the portion of a block; and performing a read sweep on the at least one block and/or the portion of a block.

18. The computer program product as recited in claim 15, wherein the non-volatile memory includes NAND Flash memory, wherein the re-evaluating is performed in response to determining that the at least one block of the non-volatile memory and/or portion of the block of the non-volatile memory meets the retirement condition.

\* \* \* \* \*